(12) United States Patent
Tang

(10) Patent No.: US 7,564,635 B1
(45) Date of Patent: Jul. 21, 2009

(54) OPTICAL LENS SYSTEM FOR TAKING IMAGE

(75) Inventor: Hsiang-Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/202,264

(22) Filed: Aug. 30, 2008

(30) Foreign Application Priority Data

Feb. 27, 2008 (TW) ............................... 97106913 A

(51) Int. Cl.
*G02B 9/12* (2006.01)
(52) U.S. Cl. .................... 359/792; 359/716; 359/739; 359/784
(58) Field of Classification Search .................. 359/716, 359/739, 784, 792
See application file for complete search history.

(56) References Cited

U.S. PATENT DOCUMENTS 6,795,253 B2 * 9/2004 Shinohara .................... 359/716
6,970,306 B2 * 11/2005 Matsuo ......................... 359/716

* cited by examiner

*Primary Examiner*—Evelyn A. Lester
(74) *Attorney, Agent, or Firm*—Banger Shia

(57) ABSTRACT

An optical lens system for taking image consisting of: an aperture stop; a first lens element with positive refractive power having a convex object-side surface; a plastic second lens element with positive refractive power having a concave object-side surface and a convex image-side surface, at least one of the object-side and the image-side surfaces of the second lens element being aspheric; and a plastic third lens element with positive refractive power having a convex object-side surface, at least one of the object-side and the image-side surfaces of the third lens element being aspheric. A focal length of the optical lens system for taking image is f, a focal length of the second lens element is f2, a focal length of the third lens element is f3, and at least one of the relations of f/f2 and f/f3 is larger than 0.1.

24 Claims, 6 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera, such as the optical lens system for taking image described in U.S. Pat. No. 7,145,736, usually consists of three lens elements, from the object side to the image side: a first lens element with positive refractive power, a second lens element with negative refractive power and a third lens element with positive refractive power. The refractive power arrangement of the lens elements is favorable to correct various aberrations caused by the system, however, the second lens element is a negative lens element and the refractive power of the third lens element is generally small. So in order to provide the refractive power required by the optical lens system, the refractive power of the first lens element must be increased. As a result, the sensitivity of the optical lens system will be increased comparatively, such that the production yield of the optical lens system is reduced.

An optical lens system for taking image which uses lens elements made of glass and plastic is described in U.S. Pat. No. 6,490,102, wherein the third lens element is a spherical glass lens element. The use of the spherical lens element reduces the degrees of freedom available for correcting the off-axis aberration of the optical lens system, making it more difficult to control image quality.

The present invention has arisen to mitigate and/or obviate the afore-described disadvantages.

SUMMARY OF THE INVENTION

The primary objective of the present invention is to improve image quality, while considering the ease of manufacture of the lens elements. The present invention provides a three-lens type optical lens system.

An optical lens system for taking image in accordance with the present invention comprises: in order from the object side to the image side:

a first lens element with positive refractive power having a convex object-side surface;

a plastic second lens element with positive refractive power having a concave object-side surface and a convex image-side surface, at least one of the object-side surface and the image-side surface of the second lens element being aspheric; and a third lens element with positive refractive power having a convex object-side surface, at least one of the object-side surface and the image-side surface of the third lens element being aspheric.

In the present optical lens system for taking image, the required refractive power to the optical lens system is mainly supplied by the first lens element with positive refractive power. The second and third lens elements serve as correction lens elements to effectively distribute the refractive power of the first lens element, so as to reduce the aberration caused by the optical lens system.

The first lens element provides enough positive refractive power, and the aperture stop is located close to the object side, so that a total track length (TTL) of the optical lens system for taking image can be effectively reduced (the total track length here is defined as a distance from the position of the object-side surface of the first lens element on the optical axis to the image plane, which includes a thickness of a flat glass between the image-side surface of the last lens element and the image plane). In addition, the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading.

For a wide-angle optical lens system, the correction to the distortion and the chromatic aberration of magnification is very important, and the correction is made by arranging the aperture stop at a balanced position of the refractive power of the optical lens system.

If the aperture stop of the present optical lens system is arranged between the first lens element and the second lens element, a balance between the properties of telecentric and wide field of view will be achieved and the sensitivity of the optical lens system can be reduced effectively.

With the miniaturization of the optical lens system and the requirement of a large field of view, the focal length of the optical lens system is becoming very short. Therefore, the radius of curvature and the size of the lens elements must be very small, and it is impossible to make such glass lens elements by conventional grind method. Plastic material is introduced to make lens elements by injection molding, using a relatively low cost to produce high precision lens elements. The surfaces of lens element are aspheric, allowing more design parameters (than spherical surfaces), so as to better reduce the aberration and the number of the lens elements.

In the present optical lens system for taking image, the first lens element has the convex object-side surface and a convex or concave image-side surface, the second lens element has the concave object-side surface and the convex image-side surface, and the third lens element has the convex object-side surface and a concave image-side surface. Such arrangements can effectively improve image quality of the system.

In the present optical lens system for taking image, a focal length of the optical lens system for taking image is f, a focal length of the second lens element is f2, a focal length of the third lens element is f3, at least one of the relations of f/f2 and f/f3 is larger than 0.1.

If f/f2 or f/f3 satisfies the above relation, the second and third lens elements can effectively distribute the refractive power of the first lens element. And it will be better if at least one of the relations of f/f2 and f/f3 is larger than 0.2.

In the present optical lens system for taking image, the focal length of the first lens element is f1, the focal length of the second lens element is f2, the focal length of the third lens element is f3, and they satisfy the relations:

$f3/f1 > 3$;

$f2/f1 > 2$.

If f3/f1 and f2/f1 satisfy the above relations, the second and third lens elements serve as correction lens elements to effectively reduce the aberration caused by the optical lens system. And it will be better if f3/f1 satisfies the relation:

$f3/f1 > 6$.

In the present optical lens system for taking image, an Abbe number of the second lens element is V2, and it satisfies the relation:

$V2 > 40$.

If V2 satisfies the above relation, it is favorable to correct the coma aberration of the system. And it will be better if the Abbe number V1 of the first lens element, the Abbe number V2 of the second lens element and the Abbe number V3 of the third lens element V3 satisfy the relations:

$52 < V1 < 62$;

$52 < V2 < 62$;

$52 < V3 < 62$.

In the present optical lens system for taking image, the refractive index of the first lens element is N1, the refractive index of the second lens element is N2, the refractive index of the third lens element is N3, and they satisfy the relations:

$1.52 < N1 < 1.60$;

$1.52 < N2 < 1.60$;

$1.52 < N3 < 1.60$.

If N1, N2 and N3 satisfy the above relations, it is easy to find suitable plastic material to match the optical lens system.

In the present optical lens system for taking image, the focal length of the optical lens system for taking image is f, the focal length of the first lens element is f1, and they satisfy the relation:

$0.7 < f/f1 < 1.05$.

If the value of f/f1 is smaller than the above lower limit, the refractive power of the system will be weak, the total track length of the system will be too long, and it will be difficult to suppress the incident angle of the light with respect to the sensor. And if the value of f/f1 is greater than the above upper limit, the high order aberration of the system will be too large.

In the present optical lens system for taking image, the radius of curvature of the object-side surface of the first lens element is R1, the radius of curvature of the image-side surface of the first lens element is R2, and they satisfy the relation:

$0.25 < R1/R2 < 0.7$.

If the value of R1/R2 is smaller than the above lower limit, it will be difficult to correct the astigmatism caused by the system. And if the value of R1/R2 is greater than the above upper limit, it will be difficult to correct the spherical aberration caused by the system.

In the present optical lens system for taking image, the edge thickness of the third lens element is ET3, the center thickness of the third lens element is CT3, and they satisfy the relation:

$0.8 < ET3/CT3 < 1.4$.

The edge thickness is: the length projected on an optical axis by the distance between the positions of the effective diameter of the object-side and the image-side surfaces of the lens.

The above relation can effectively correct the off-axis aberration of the system, so as to improve the image quality. And it will be better if the value of ET3/CT3 satisfies the relation:

$0.9 < ET3/CT3 < 1.1$.

In the present optical lens system for taking image, making the periphery of the third lens element have a negative refractive power can effectively flatten the periphery of the image, so as to improve the image quality of the periphery of the image.

In the present optical lens system for taking picture, an object to be photographed is imaged on an electronic imaging sensor, the total track length of the system is TTL, the image height of the system is ImgH, and they satisfy the relation:

$TTL/ImgH < 2.35$.

The above relation can maintain the objective of miniaturization of the optical lens system for taking image.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
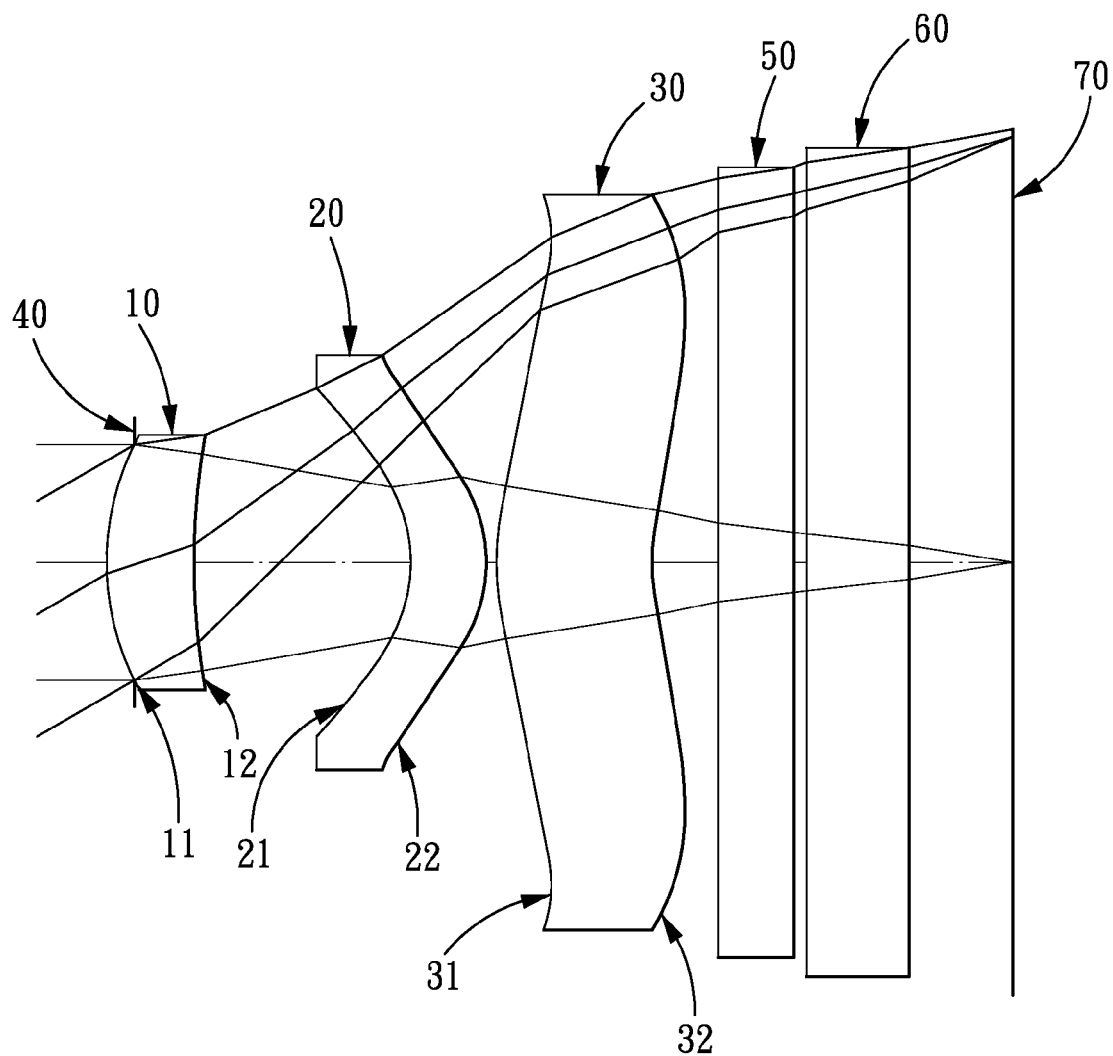
FIG. 1 shows an optical lens system for taking image in accordance with a first embodiment of the present invention.
Figure 2:
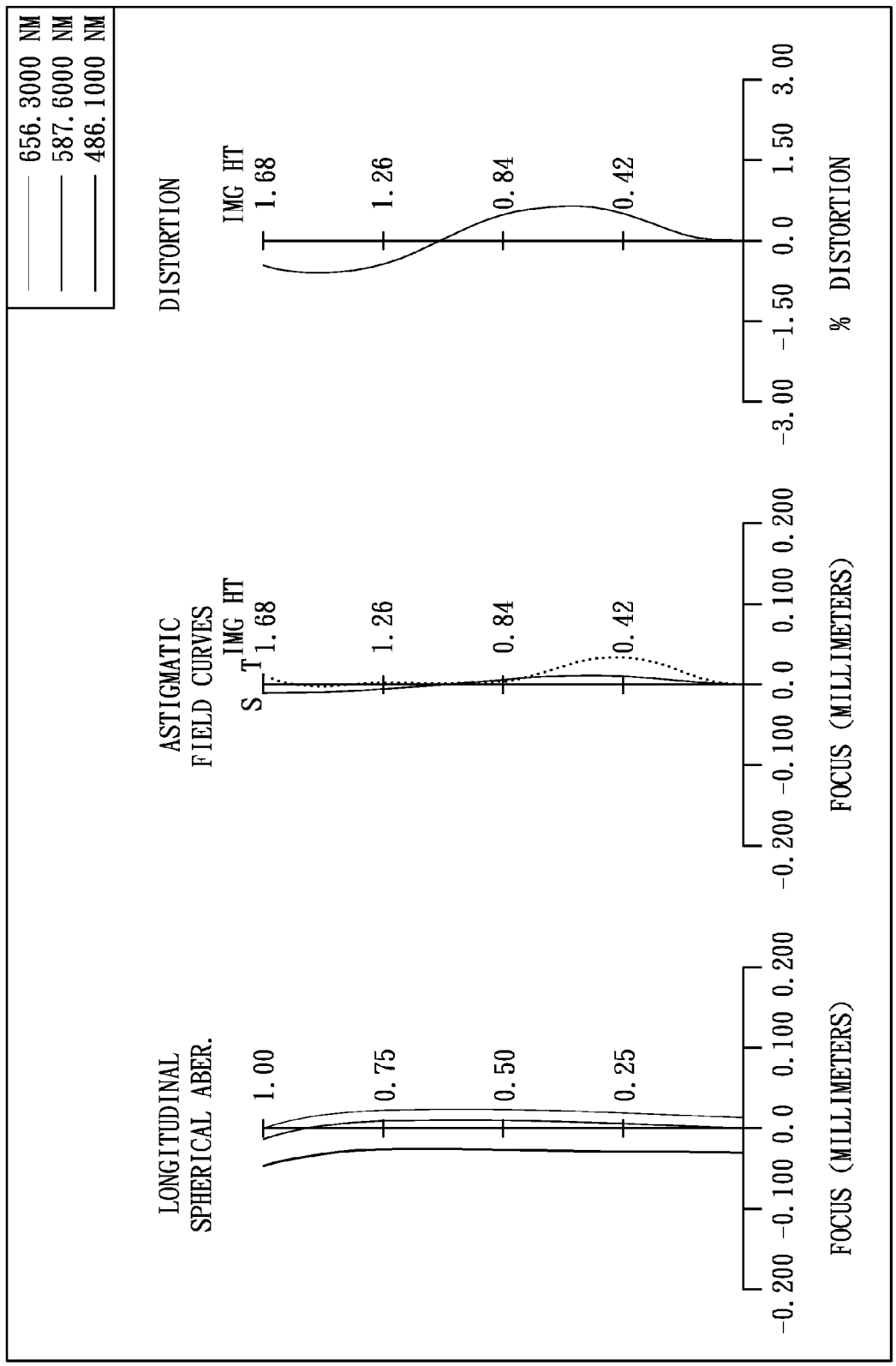
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. An optical lens system for taking image in accordance with a first embodiment of the present invention comprises: in order from the object side to the image side:

An aperture stop 40.

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with positive refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a concave image-side surface 32, and the object-side surface 31 and the image-side surface 32 of the third lens element 30 are aspheric.

An IR cut filter 50 is located behind the third lens element 30 and has no influence on the focal length of the optical lens system.

A sensor cover glass 60 is located behind the IR cut filter 60 and has no influence on the focal length of the optical lens system.

An image plane 70 is located behind the sensor cover glass 60.

The equation for the aspheric surface profiles of the first embodiment is expressed as follows:

$$X(Y) = (Y^2/R)/(1 + sqrt(1 - (1+k)*(Y/R)^2)) + \sum_i (A_i)*(Y^i)$$

wherein:

X: the height of a point on the aspheric lens surface at a distance Y from the optical axis relative to the tangential plane of the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the second lens element is f2, the focal length of the third lens element is f3, and they satisfy the relations:

f=2.62 mm;

f/f1=0.86;

f/f2=0.04;

f/f3=0.22;

f2/f1=19.43;

f3/f1=3.88.

In the first embodiment of the present optical lens system for taking image, the refractive index of the first lens element is N1, the refractive index of the second lens element is N2, the refractive index of the third lens element is N3, and they satisfy the relations:

N1=1.544;

N2=1.544;

N3=1.544.

In the first embodiment of the present optical lens system for taking image, the Abbe number of the first lens element is V1 the Abbe number of the second lens element is V2, the Abbe number of the third lens element is V3, and they satisfy the relations:

V1=55.9;

V2=55.9;

V3=55.9.

In the first embodiment of the present optical lens system for taking image, the radius of curvature of the object-side surface of the first lens element is R1, the radius of curvature of the image-side surface of the first lens element is R2, and they satisfy the relation:

R1/R2=0.34.

In the first embodiment of the present optical lens system for taking image, the edge thickness of the third lens element is ET3, the center thickness of the third lens element is CT3, and they satisfy the relation:

ET3/CT3=0.65.

In the first embodiment of the present optical lens system for taking image, the total track length of the optical lens system for taking image is TTL, the maximum image height of the optical lens system for taking image is Imgh, and they satisfy the relation:

TTL/ImgH=2.11.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 2.62 mm, Fno = 2.83, HFOV(half of field of view) = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.097 | | | | |
| 2 | Lens 1 | 1.15742(ASP) | 0.324 | Plastic | 1.544 | 55.9 | 3.06 |
| 3 | | 3.42870(ASP) | 0.845 | | | | |
| 4 | Lens 2 | −0.54216(ASP) | 0.300 | Plastic | 1.544 | 55.9 | 59.40 |
| 5 | | −0.63719(ASP) | 0.050 | | | | |
| 6 | Lens 3 | 1.36830(ASP) | 0.625 | Plastic | 1.544 | 55.9 | 11.87 |
| 7 | | 1.45676(ASP) | 0.250 | | | | |
| 8 | IR-filter | Plano | 0.300 | Glass | 1.517 | 64.2 | |
| 9 | | Plano | 0.050 | | | | |
| 10 | Sensor Cover Glass | Plano | 0.400 | Glass | 1.517 | 64.2 | |
| 11 | | Plano | 0.407 | | | | |
| 12 | Image | Plano | | | | | |

TABLE 2

| Aspheric Coefficients | | | | | | |
|---|---|---|---|---|---|---|
| Surface # | 2 | 3 | 4 | 5 | 6 | 7 |
| k = | −1.81882E−01 | 3.60023E+01 | −6.10384E−01 | −9.24869E−01 | −7.88241E+00 | −6.45929E+00 |
| A4 = | 8.60233E−02 | 5.25618E−03 | 4.00551E−01 | −6.63351E−02 | −1.03925E−01 | −1.87211E−01 |
| A6 = | −1.50472E−02 | −5.02195E−01 | 4.75880E−01 | 2.30581E−01 | 9.66128E−02 | 1.10788E−01 |
| A8 = | 4.75950E−01 | 2.79215E+00 | −4.43560E−00 | 5.25284E−01 | −4.34932E−02 | −4.33451E−02 |
| A10 = | | −7.90842E+00 | 8.16882E+00 | 5.46476E−01 | 1.44641E−03 | 6.10503E−03 |
| A12 = | | | −8.56322E+00 | −8.42492E−01 | 1.80807E−03 | −3.48397E−04 |

Figure 3:
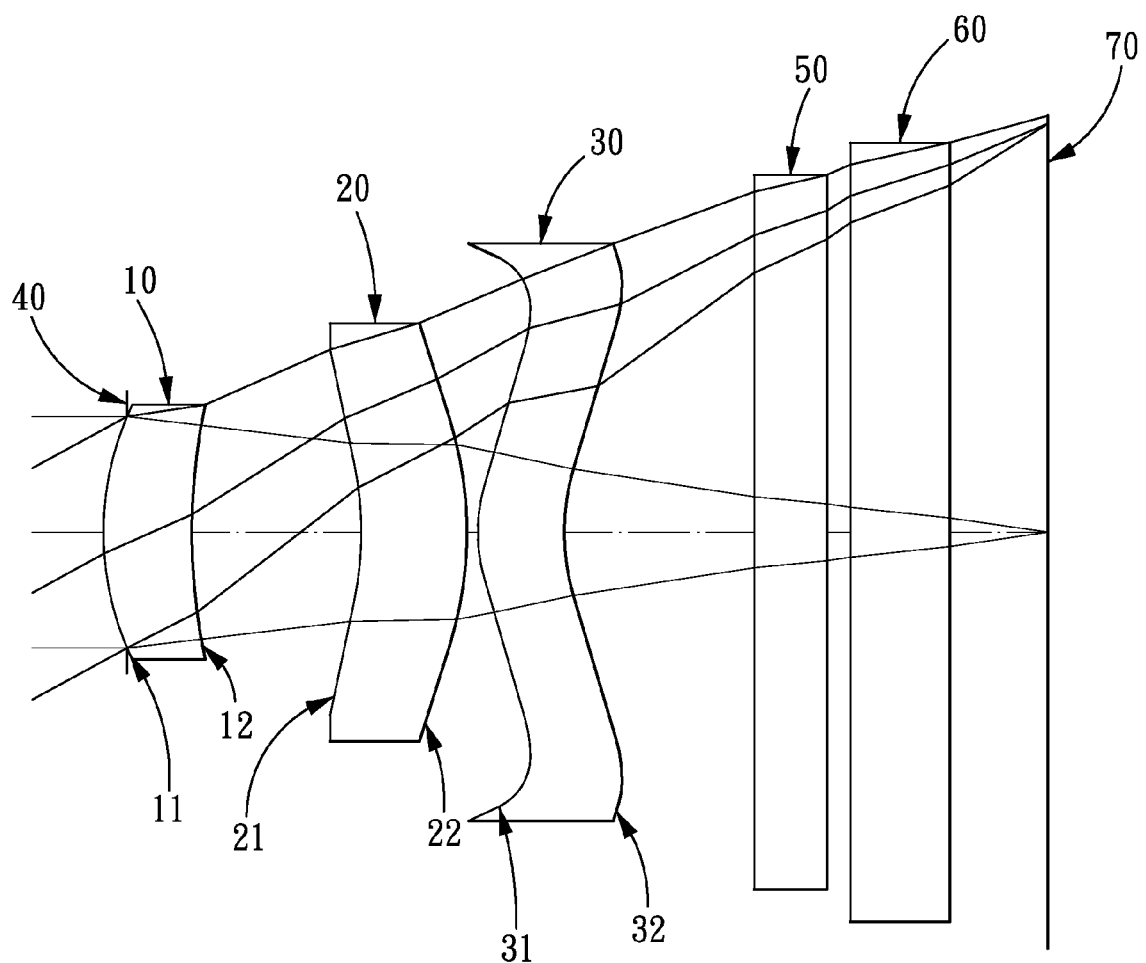
FIG. 3 shows an optical lens system for taking image in accordance with a second embodiment of the present invention.
Figure 4:
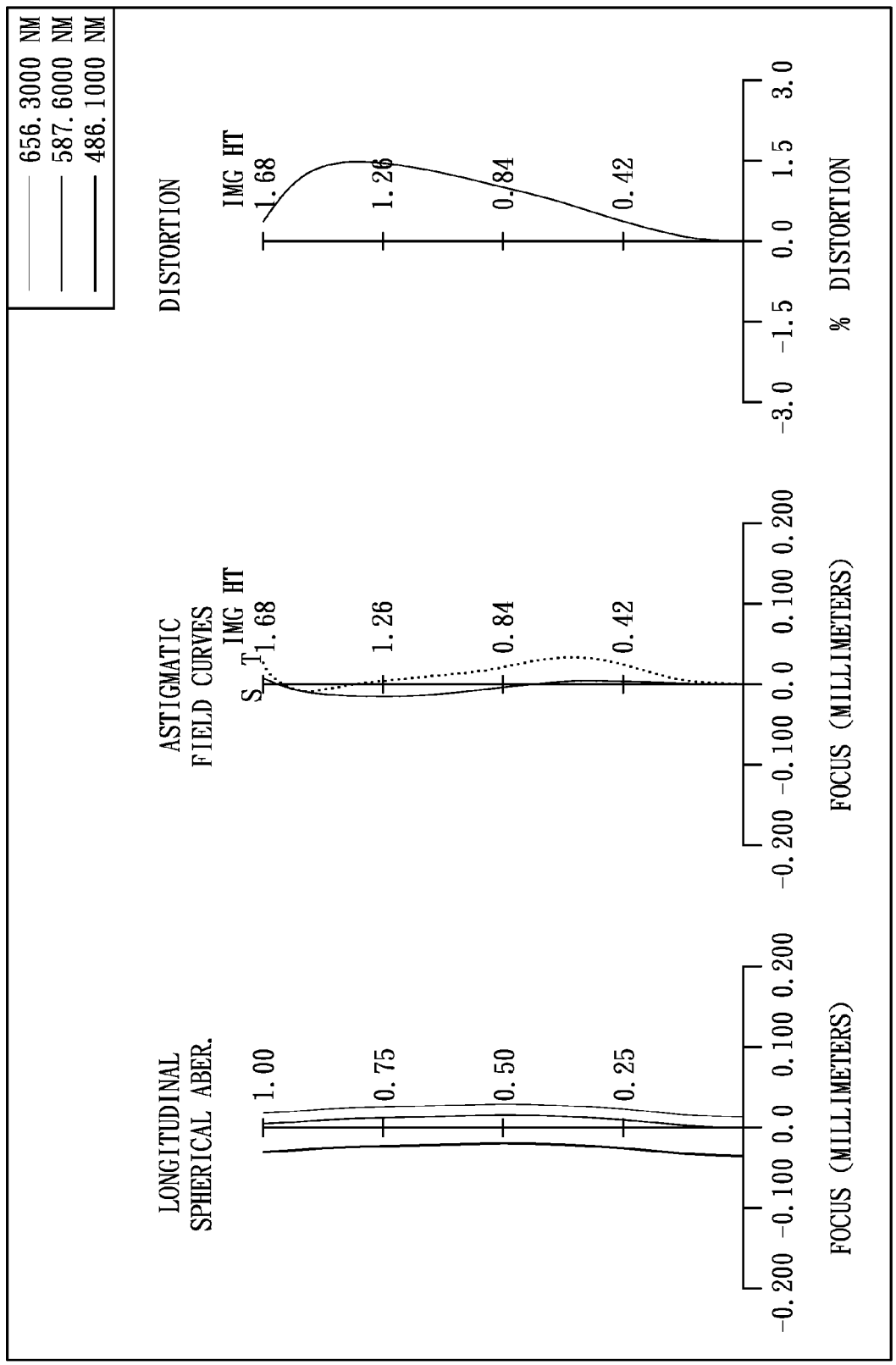
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention comprises: in order from the object side to the image side:

An aperture stop 40.

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with positive refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a concave image-side surface 32, the object-side surface 31 and the image-side surface 32 of the third lens element 30 are aspheric, and the peripheral edge of the third lens element 30 has a negative refractive power.

An IR cut filter 50 is located behind the third lens element 30 and has no influence on the focal length of the optical lens system.

A sensor cover glass 60 is located behind the IR cut filter 60 and has no influence on the focal length of the optical lens system.

An image plane 70 is located behind the sensor cover glass 60.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the second lens element is f2, the focal length of the third lens element is f3, and they satisfy the relations:

$F=3.04$ mm;

$f/f1=0.75$;

$f/f2=0.26$;

$f/f3=0.06$;

$f2/f1=2.90$;

$f3/f1=12.98$.

In the second embodiment of the present optical lens system for taking image, the refractive index of the first lens element is N1, the refractive index of the second lens element is N2, the refractive index of the third lens element is N3, and they satisfy the relations:

$N1=1.544$;

$N2=1.544$;

$N3=1.544$.

In the second embodiment of the present optical lens system for taking image, the Abbe number of the first lens element is V1, the Abbe number of the second lens element is V2, the Abbe number of the third lens element is V3, and they satisfy the relations:

$V1=55.9$;

$V2=55.9$;

$V3=55.9$.

In the second embodiment of the present optical lens system for taking image, the radius of curvature of the object-side surface of the first lens element is R1, the radius of curvature of the image-side surface of the first lens element is R2, and they satisfy the relation:

$R1/R2=0.47$.

In the second embodiment of the present optical lens system for taking image, the edge thickness of the third lens element is ET3, the center thickness of the third lens element is CT3, and they satisfy the relation:

$ET3/CT3=1.06$.

In the second embodiment of the present optical lens system for taking image, the total track length of the optical lens system for taking image is TTL, the maximum image height of the optical lens system for taking image is ImgH, and they satisfy the relation:

$TTL/ImgH=2.31$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 3.04 mm, Fno = 3.2, HFOV(half of field of view) = 28.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.09 | | | | |
| 2 | Lens 1 | 1.27257(ASP) | 0.355 | Plastic | 1.544 | 55.9 | 4.04 |
| 3 | | 2.72255(ASP) | 0.692 | | | | |
| 4 | Lens 2 | −1.35999(ASP) | 0.424 | Plastic | 1.544 | 55.9 | 11.75 |
| 5 | | −1.24471(ASP) | 0.050 | | | | |
| 6 | Lens 3 | 1.04656(ASP) | 0.350 | Plastic | 1.544 | 55.9 | 52.46 |
| 7 | | 0.95836(ASP) | 0.800 | | | | |
| 8 | IR-filter | Plano | 0.300 | Glass | 1.517 | 64.2 | |
| 9 | | Plano | 0.100 | | | | |
| 10 | Sensor Cover Glass | Plano | 0.400 | Glass | 1.517 | 64.2 | |
| 11 | | Plano | 0.401 | | | | |
| 12 | Image | Plano | | | | | |

TABLE 4

Aspheric Coefficients

| Surface # | 2 | 3 | 4 | 5 | 6 | 7 |
|---|---|---|---|---|---|---|
| k = | −3.89305E−01 | 2.08228E+01 | −3.78636E−01 | −2.89933E+00 | −1.29472E+00 | −1.91756E+00 |
| A4 = | 6.14447E−02 | −1.07163E−03 | 3.70316E−01 | 6.58893E−02 | −2.76837E−01 | −2.50759E−01 |
| A6 = | 7.71456E−02 | −5.47057E−01 | 1.42616E−01 | −4.88203E−03 | 3.34275E−02 | 1.03315E−01 |
| A8 = | −1.13448E−02 | 2.93527E+00 | −2.20086E+00 | −2.83119E−02 | −1.27310E−04 | −4.40820E−02 |
| A10 = | | −9.19340E+00 | 5.62154E+00 | 3.78583E−01 | 4.82019E−02 | 1.64415E−03 |
| A12 = | | | −4.81422E+00 | −3.71796E−01 | −6.91957E−02 | −1.82834E−03 |

Figure 5:
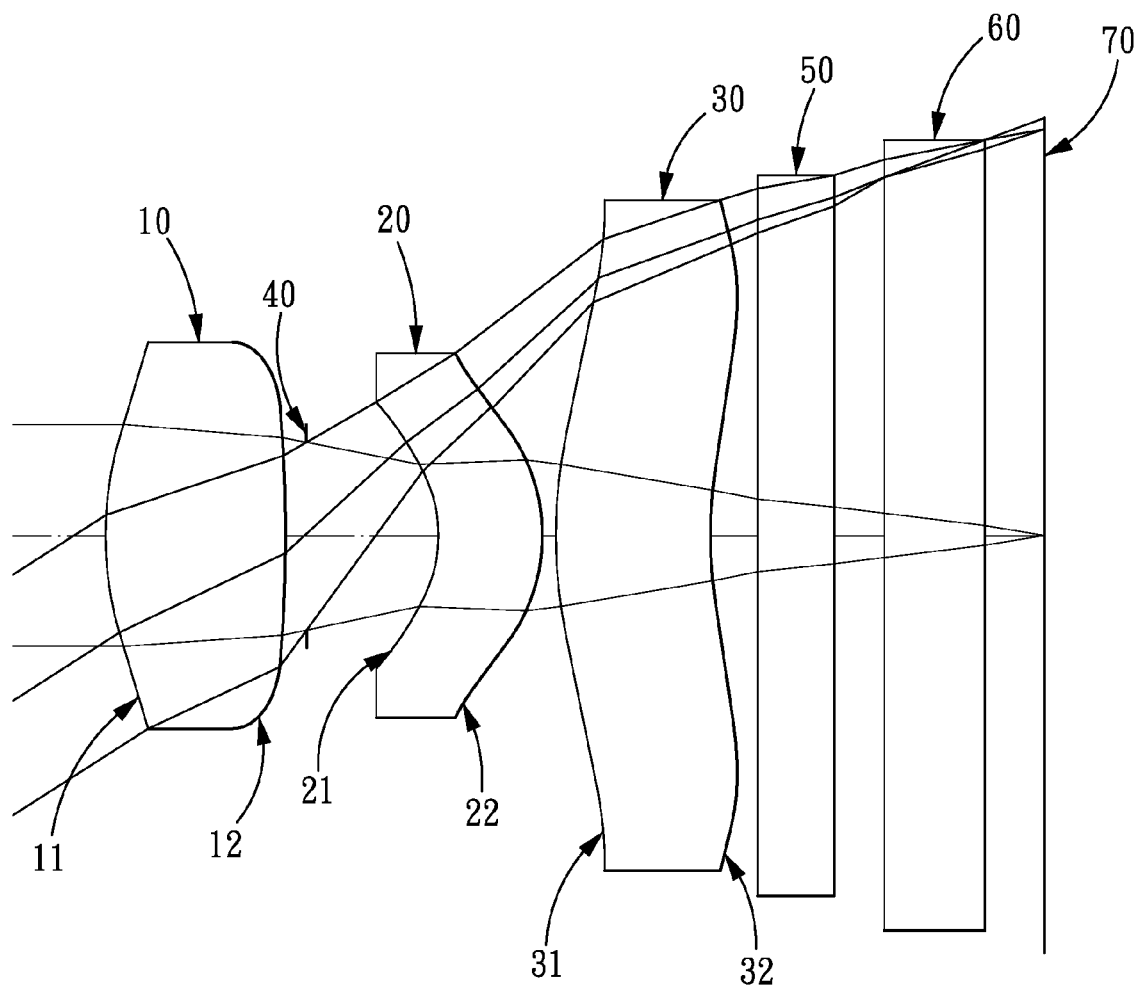
FIG. 5 shows an optical lens system for taking image in accordance with a third embodiment of the present invention.
Figure 6:
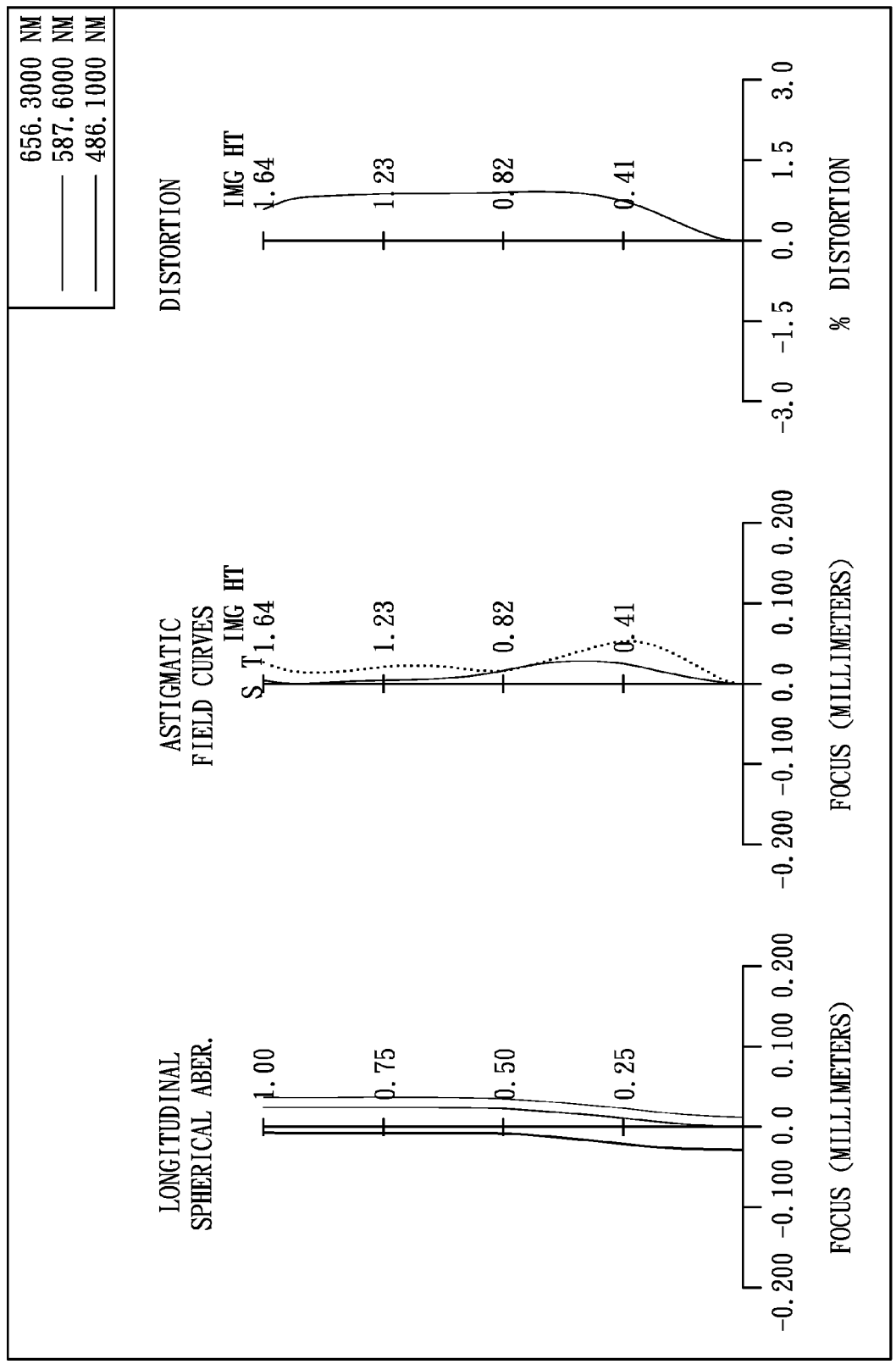
FIG. 6 shows the aberration curve of the third embodiment of the present invention.

Referring to FIG. 5, which shows an optical lens system for taking image in accordance with a third embodiment of the present invention, and FIG. 6 shows the aberration curve of the third embodiment of the present invention. The third embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

An aperture stop 40.

A plastic second lens element 20 with positive refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a concave image-side surface 32, the object-side surface 31 and the image-side surface 32 of the third lens element 30 are aspheric, and the peripheral edge of the third lens element 30 has a negative refractive power.

An IR cut filter 50 is located behind the third lens element 30 and has no influence on the focal length of the optical lens system.

A sensor cover glass 60 is located behind the IR cut filter 60 and has no influence on the focal length of the optical lens system.

An image plane 70 is located behind the sensor cover glass 60.

The equation for the aspheric surface profiles of the third embodiment has the same form as that of the first embodiment.

In the third embodiment of the present optical lens system for taking image, the focal length of the optical lens system for taking image is f, the focal length of the first lens element is f1, the focal length of the second lens element is f2, the focal length of the third lens element is f3, and they satisfy the relations:

$f=2.56$ mm;

$f/f1=0.98$;

$f/f2=2=0.06$;

$f/f3=0.11$;

$f2/f1=17.80$;

$f3/f1=8.89$.

In the third embodiment of the present optical lens system for taking image, the refractive index of the first lens element is N1, the refractive index of the second lens element is N2, the refractive index of the third lens element is N3, and they satisfy the relations:

$N1=1.544$;

$N2=1.544$;

$N3=1.544$.

In the third embodiment of the present optical lens system for taking image, the Abbe number of the first lens element is V1, the Abbe number of the second lens element is V2, the Abbe number of the third lens element is V3, and they satisfy the relations:

$V1=55.9;$ $V2=55.9;$ $V3=55.9.$

In the third embodiment of the present optical lens system for taking image, the radius of curvature of the object-side surface of the first lens element is R1, the radius of curvature of the image-side surface of the first lens element is R2, and they satisfy the relation:

$R1/R2=-0.12.$

In the third embodiment of the present optical lens system for taking image, the edge thickness of the third lens element is ET3, the center thickness of the third lens element is CT3, and they satisfy the relation:

$ET3/CT3=0.79.$

In the third embodiment of the present optical lens system for taking image, the total track length of the optical lens system for taking image is TTL, the maximum image height of the optical lens system for taking image is ImgH, and they satisfy the relation:

$TTL/ImgH=2.26.$

The detailed optical data of the third embodiment is shown in table 5, and the aspheric surface data is shown in table 6, wherein the units of the radius of curvature, the thickness and the focal length are expressed in mm, and HFOV is half of the maximal field of view.

In the present optical lens system for taking image, the second lens element is made of plastic, and the first and third lens elements can be made of glass or plastic. If the lens elements are made of glass, the freedom of distributing the refractive power of the optical lens system will be improved. If the lens elements are made of plastic, the cost will be effectively reduced.

TABLE 5

(Embodiment 3)
f(focal length) = 2.56 mm, Fno = 2.85, HFOV(half of field of view) = 32.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.54804(ASP) | 0.701 | Plastic | 1.544 | 55.9 | 2.59 |
| 2 | | −13.38270(ASP) | 0.085 | | | | |
| 3 | Aperture Stop | Plano | 0.526 | | | | |
| 4 | Lens 2 | −0.56535(ASP) | 0.409 | Plastic | 1.544 | 55.9 | 46.16 |
| 5 | | −0.69386(ASP) | 0.050 | | | | |
| 6 | Lens 3 | 1.46087(ASP) | 0.604 | Plastic | 1.544 | 55.9 | 23.05 |
| 7 | | 1.41254(ASP) | 0.200 | | | | |
| 8 | IR-filter | Plano | 0.300 | Glass | 1.517 | 64.1 | |
| 9 | | Plano | 0.200 | | | | |
| 10 | Sensor Cover Glass | Plano | 0.400 | Glass | 1.517 | 64.1 | |
| 11 | | Plano | 0.229 | | | | |
| 12 | Image | Plano | | | | | |

TABLE 6

Aspheric Coefficients

| Surface # | 2 | 3 | 4 | 5 | 6 | 7 |
|---|---|---|---|---|---|---|
| k = | 1.34048E−01 | −7.48681E+02 | −1.06097E+00 | −7.38290E−01 | −2.59384E+01 | −1.08384E+01 |
| A4 = | −4.70237E−02 | −1.72547E−01 | −6.52384E−02 | −3.28052E−01 | −4.90865E−02 | −1.73119E−01 |
| A6 = | −4.80440E−02 | −4.13931E−01 | −2.87295E+00 | 9.84203E−01 | −1.19674E−01 | 1.24236E−01 |
| A8 = | −8.68674E−02 | 2.27129E+00 | 1.77466E+01 | 6.02267E−01 | −9.66213E−02 | −6.80533E−02 |
| A10 = | −3.80478E−02 | −4.47306E+00 | −4.06040E+01 | −2.57130E+00 | 2.81994E−02 | 2.88669E−02 |
| A12 = | | | −4.82153E+01 | 5.10888E+00 | −2.23770E−03 | −1.10489E−02 |
| A14 = | | | | −3.38609E+00 | | 1.86325E−03 |

TABLE 7

| | Embodiment 1 | Embodiment 2 | Embodiment 3 |
|---|---|---|---|
| f | 2.62 | 3.04 | 2.56 |
| Fno | 2.83 | 3.20 | 2.85 |
| HFOV | 32.9 | 28.9 | 32.6 |
| V1 | 55.9 | 55.9 | 55.9 |
| V2 | 55.9 | 55.9 | 55.9 |
| V3 | 55.9 | 55.9 | 55.9 |
| N1 | 1.544 | 1.544 | 1.544 |
| N2 | 1.544 | 1.544 | 1.544 |
| N3 | 1.544 | 1.544 | 1.544 |
| f/f1 | 0.86 | 0.75 | 0.98 |
| f/f2 | 0.04 | 0.26 | 0.06 |
| f/f3 | 0.22 | 0.06 | 0.11 |
| f2/f1 | 19.43 | 2.90 | 17.80 |
| F3/f1 | 3.88 | 12.98 | 8.89 |
| R1/R2 | 0.34 | 0.47 | −0.12 |
| ET3/CT3 | 0.65 | 1.06 | 0.79 |
| TTL/ImgH | 2.11 | 2.31 | 2.26 |

It is to be noted that the tables 1-6 show different data from the different embodiments, however, the data of the different embodiments is obtained from experiments. Therefore, any product of the same structure is deemed to be within the scope of the present invention even if it uses different data. Table 7 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image consisting of three lens elements with refractive power, in order from the object side to the image side:
   an aperture stop;
   a first lens element with positive refractive power having a convex object-side surface;
   a plastic second lens element with positive refractive power having a concave object-side surface and a convex image-side surface, at least one of the object-side and the image-side surfaces of the second lens element being aspheric; and
   a third lens element with positive refractive power having a convex object-side surface, at least one of the object-side and the image-side surfaces of the third lens element being aspheric;
   a focal length of the optical lens system for taking image being f, a focal length of the second lens element being f2, a focal length of the third lens element being f3, at least one of the relations of f/f2 and f/f3 being larger than 0.1.

2. The optical lens system for taking image as claimed in claim 1, wherein the object-side surface and the image-side surface of the first lens element are aspheric, the object-side surface and the image-side surface of the second lens element are aspheric, the third lens element is made of plastic material and has a concave image-side surface, and the object-side surface and the image-side surface of the third lens element are aspheric.

3. The optical lens system for taking image as claimed in claim 2, wherein the first lens element is made of plastic material and has a concave image-side surface.

4. The optical lens system for taking image as claimed in claim 3, wherein the focal length of the optical lens system for taking image is f, the focal length of the second lens element is f2, the focal length of the third lens element is f3, and at least one of the relations of f/f2 and f/f3 is larger than 0.2.

5. The optical lens system for taking image as claimed in claim 4, wherein a focal length of the first lens element is f1, the focal length of the third lens element is f3, and they satisfy the relation:

$$f3/f1 > 3.$$

6. The optical lens system for taking image as claimed in claim 5, wherein the focal length of the first lens element is f1, the focal length of the second lens element is f2, and they satisfy the relation:

$$f2/f1 > 2.$$

7. The optical lens system for talking image as claimed in claim 5, wherein the focal length of the first lens element is f1, the focal length of the third lens element is f3, and they satisfy the relation:

$$f3/f1 > 6.$$

8. The optical lens system for taking image as claimed in claim 3, wherein an Abbe number of the second lens element is V2, and it satisfies the relation:

$$V2 > 40.$$

9. The optical lens system for taking image as claimed in claim 8, Wherein an Abbe number of the first lens element is V1, the Abbe number of the second lens element is V2, an Abbe number of the third lens element is V3, and they satisfy the relations:

$$52 < V1 < 62;$$

$$52 < V2 < 62;$$

$$52 < V3 < 62.$$

10. The optical lens system for taking image as claimed in claim 9, wherein a refractive index of the first lens element is N1, a refractive index of the second lens element is N2, a refractive index of the third lens element is N3, and they satisfy the relations:

$$< N1 < 1.60;$$

$$1.52 < N2 < 1.60;$$

$$1.52 < N3 < 1.60.$$

11. The optical lens system for taking image as claimed in claim 3, wherein the focal length of the optical lens system for taking image is f, a focal length of the first lens element is f1, and they satisfy the relation:

$$0.7 < f/f1 < 1.05.$$

12. The optical lens system for taking image as claimed in claim 1, wherein a radius of curvature of the object-side surface of the first lens element is R1, a radius of curvature of an image-side surface of the first lens element is R2, and they satisfy the relation:

$$0.25 < R1/R2 < 0.7.$$

13. The optical lens system for taking image as claimed in claim 3, Wherein an edge thickness of the third lens element is ET3, a center thickness of the third lens element is CT3, and they satisfy the relation:

$$0.8 < ET3/CT3 < 1.4.$$

14. The optical lens system for taking image as claimed in claim 13, wherein the edge thickness of the third lens element is ET3, the center thickness of the third lens element is CT3, and they satisfy the relation:

$$0.9 < ET3/CT3 < 1.1.$$

15. The optical lens system for taking image as claimed in claim 14, wherein a peripheral edge of the third lens element has a negative refractive power.

16. The optical lens system for taking image as claimed in claim 1 further comprising an electronic imaging sensor for enabling an object to be photographed to be imaged on it, a total track length of the optical lens system for taking image is TTL, a maximum image height of the optical lens system for taking image is ImgH, and they satisfy the relation:

$$TTL/ImgH < 2.35.$$

17. An optical lens system for taking image consisting of three lens elements with refractive power, in order from the object side to the image side:
   a first lens element with positive refractive power having a convex object-side surface and a convex image-side surface;

a plastic second lens element with positive refractive power having a concave object-side surface and a convex image-side surface, at least one of the object-side and the image-side surfaces of the second lens element being aspheric; and
a third lens element with positive refractive power;
a focal length of the first lens element being f1, a focal length of the third lens element being f3, they satisfying the relation:

$$f/f1>3.$$

18. The optical lens system for taking image as claimed in claim 17, wherein the object-side surface and the image-side surface of the first lens element are aspheric, the object-side surface and the image-side surface of the second lens element are aspheric, the third lens element is made of plastic material and has a convex object-side surface and a concave image-side surface, and the object-side surface and the image-side surface of the third lens element are aspheric.

19. The optical lens system for taking image as claimed in claim 18 further comprising an aperture stop located between the first lens element and the second lens element, and the first lens element is made of plastic material.

20. The optical lens system for taking image as claimed in claim 19, wherein a refractive index of the first lens element is N1, a refractive index of the second lens element is N2, a refractive index of the third lens element is N3, and they satisfy the relations:

$$1.52<N1<1.60;$$

$$1.52<N2<1.60;$$

$$1.52<N3<1.60.$$

21. The optical lens system for taking image as claimed in claim 20, wherein an Abbe number of the first lens element is V1, an Abbe number of the second lens element is V2, an Abbe number of the third lens element is V3, and they satisfy the relations:

$$52<V1<62;$$

$$52<V2<62;$$

$$52<V3<62.$$

22. The optical lens system for taking image as claimed in claim 19, wherein a focal length of the optical lens system for taking image being f, the focal length of the first lens element is f1, the focal length of the third lens element is f3, and they satisfy the relations:

$$0.7<f/f1<1.05;$$

$$f3/f1>6.$$

23. The optical lens system for taking image as claimed in claim 21, wherein a peripheral edge of the third lens element has a negative refractive power.

24. The optical lens system for taking image as claimed in claim 17 further comprising an electronic imaging sensor for enabling an object to be photographed to be imaged on it, a total track length of the optical lens system for taking image is TTL, a maximum image height of the optical lens system for taking image is ImgH, and they satisfy the relation:

$$TTL/ImgH<2.35.$$

* * * * *

UNITED STATES PATENT AND TRADEMARK OFFICE
CERTIFICATE OF CORRECTION

PATENT NO.        : 7,564,635 B1                                               Page 1 of 1
APPLICATION NO.   : 12/202264
DATED             : July 21, 2009
INVENTOR(S)       : Hsiang-Chi Tang It is certified that error appears in the above-identified patent and that said Letters Patent is hereby corrected as shown below:

In the Specification, Col. 15, Claim 17, line 10, the formula should appear as $f3/f1 > 3$ Signed and Sealed this Twenty-eighth Day of September, 2010

David J. Kappos
*Director of the United States Patent and Trademark Office*